United States Patent
Fan et al.

(10) Patent No.: US 10,656,680 B2
(45) Date of Patent: May 19, 2020

(54) ELECTRONIC APPARATUS

(71) Applicant: GUANGDONG OPPO MOBILE TELECOMMUNICATIONS CORP., LTD., Dongguan, Guangdong (CN)

(72) Inventors: Xiaoyu Fan, Dongguan (CN); Zhengshan Zhang, Dongguan (CN)

(73) Assignee: GUANGDONG OPPO MOBILE TELECOMMUNICATIONS CORP., LTD, Dongguan, Guangdong (CN)

(*) Notice: Subject to any disclaimer, the term of this patent is extended or adjusted under 35 U.S.C. 154(b) by 0 days.

(21) Appl. No.: 16/203,458

(22) Filed: Nov. 28, 2018

(65) Prior Publication Data
US 2019/0250667 A1    Aug. 15, 2019

(30) Foreign Application Priority Data

Feb. 9, 2018    (CN) ................... 2018 2 0235479 U

(51) Int. Cl.
  *G06F 1/16*  (2006.01)
  *H04M 1/02*  (2006.01)
  *H04N 7/14*  (2006.01)

(52) U.S. Cl.
  CPC .......... *G06F 1/1647* (2013.01); *G06F 1/1626* (2013.01); *G06F 1/1686* (2013.01);
  (Continued)

(58) Field of Classification Search
  CPC .... G06F 1/1694; G06F 1/1647; G06F 1/1626; G06F 1/1686; H04M 1/0237;
  (Continued)

(56) References Cited

U.S. PATENT DOCUMENTS 7,432,977 B2 * 10/2008  Chiang .............. G02B 26/0816
                                                 348/344
2002/0160724 A1 * 10/2002  Arai ..................... H04N 5/2252
                                                 455/575.1
(Continued)

FOREIGN PATENT DOCUMENTS

CN           2717138 Y   *  8/2005
CN         103475782 A     12/2013
(Continued)

OTHER PUBLICATIONS

CN 2717138 Y—Machine Translation (Year: 2019).*
(Continued)

*Primary Examiner* — Rockshana D Chowdhury
(74) *Attorney, Agent, or Firm* — Ladas & Parry, LLP

(57) ABSTRACT

The present disclosure provides an electronic apparatus including a housing, a mainboard provided within the housing, and a first display screen connected to the mainboard. The housing includes a front side face, a rear side face, a left side face and a right side face, and a top face. The first display screen is provided on the front side face of the housing. A storage groove is defined on the top face of the housing. The electronic apparatus further includes a mounting frame having a rotating box rotatably connected to the mounting frame. The rotating box is provided with a camera connected to the mainboard. The mounting frame can protrude out of or retract into the storage groove thereby to drive the rotating box to move out of or into the storage groove, such that the camera is exposed of or hidden into the housing.

17 Claims, 14 Drawing Sheets

(52) U.S. Cl.
CPC ....... *H04M 1/0237* (2013.01); *H04M 1/0264* (2013.01); *H04M 1/0235* (2013.01); *H04M 1/0277* (2013.01); *H04M 2250/16* (2013.01); *H04M 2250/20* (2013.01); *H04N 2007/145* (2013.01)

(58) Field of Classification Search
CPC ............ H04M 1/0264; H04M 1/0235; H04M 2250/20; H04M 1/0277; H04M 2250/16; H04N 2007/145
See application file for complete search history.

(56) References Cited

U.S. PATENT DOCUMENTS

| | | | | |
|---|---|---|---|---|
| 2004/0012701 A1* | 1/2004 | Nagai | ................... | G06F 1/1616 348/333.12 |
| 2006/0261257 A1* | 11/2006 | Hwang | ............... | H04M 1/0264 250/216 |
| 2007/0253703 A1* | 11/2007 | Tsai | ....................... | G03B 17/02 396/429 |
| 2015/0050964 A1* | 2/2015 | Gorilovsky | ............ | H01Q 1/243 455/566 |
| 2018/0011513 A1* | 1/2018 | Cui | ....................... | G02F 1/1335 |

FOREIGN PATENT DOCUMENTS

| | | |
|---|---|---|
| CN | 104023105 A | 9/2014 |
| CN | 106850896 A | 6/2017 |
| CN | 106899721 A | 6/2017 |
| CN | 206433032 U | 8/2017 |
| CN | 207926665 U | 9/2018 |
| EP | 3373562 A1 | 9/2018 |
| EP | 3396933 A1 | 10/2018 |
| JP | 2007159237 A | 6/2007 |

OTHER PUBLICATIONS

European Search Report, EP 18208893, dated May 28, 2019 (22 pages).

International search report and Written Opinion from PCT/CN2018/116992, dated Feb. 21, 2019 (10 pages).

\* cited by examiner

ELECTRONIC APPARATUS

CROSS-REFERENCE TO RELATED APPLICATION

This application claims priority to Chinese Patent Application No. 201820235479.0, filed on Feb. 9, 2018, the contents of which are herein incorporated by reference in its entirety.

TECHNICAL FIELD

The present disclosure relates to the technical field of electronic apparatuses.

BACKGROUND

An existing electronic apparatus, for example, a mobile phone, a tablet PC, etc., is usually provided at a front face thereof with electronic devices such as a front lens assembly, an earpiece assembly and a light-ray sensor. In order to pursue a better visual experience, full-screen mobile phones have become a new trend with the development of mobile phones. However, electronic devices including a front lens assembly, an earpiece assembly, a light-ray sensor and the like on a front face of an existing full-screen mobile phone will occupy space of the front face of the electronic apparatus, thereby limiting an increase in a screen ratio of the mobile phone.

SUMMARY

An electronic apparatus includes a housing, a mainboard provided within the housing, and a first display screen connected to the mainboard. The housing includes a front side face, a rear side face, a left side face and a right side face opposite to each other, and a top face. The first display screen is provided on the front side face of the housing. A storage groove is defined on the top face of the housing in a left-right direction and is located between the front side face and the rear side face. The electronic apparatus further includes a mounting frame and a rotating box rotatably connected to the mounting frame. The rotating box is provided with a camera connected to the mainboard. The mounting frame is configured to protrude out of or retract into the storage groove to drive the rotating box to move out of or into the storage groove, such that the camera is exposed out of or hidden into the housing.

BRIEF DESCRIPTION OF THE DRAWINGS

In order to more clearly illustrate the technical solutions in the embodiments of the present disclosure, a brief introduction will be made below to the drawings required to be used in the embodiments. Evidently, the drawings in the following description are only some embodiments of the present disclosure. A person of ordinary skilled in the art can further obtain other drawings without any creative work according to these drawings.

DETAILED DESCRIPTION

A clear and complete description of the technical solutions in the embodiments of the present disclosure will be given below in conjunction with the accompanying drawings in the embodiments of the present disclosure. Apparently, the embodiments described below are merely a part of the embodiments of the present disclosure, rather than all of the embodiments. All other embodiments obtained by a person of ordinary skill in the art without creative efforts on the basis of the embodiments of the present disclosure shall fall within the protection scope of the present disclosure.

In the description of the embodiments of the present disclosure, it should be understood that, orientation or position relations denoted by the terms "upper", "lower", "left", "right" and the like, which are orientation or position relations shown on the basis of the accompanying drawings, are merely intended to facilitate describing the present disclosure in a concise manner, rather than suggest or show that the devices or elements referred to must have particular orientation and must be constructed and operated with particular orientation. Thus, the above terms shall not be construed as limiting the present disclosure.

Figure 1:
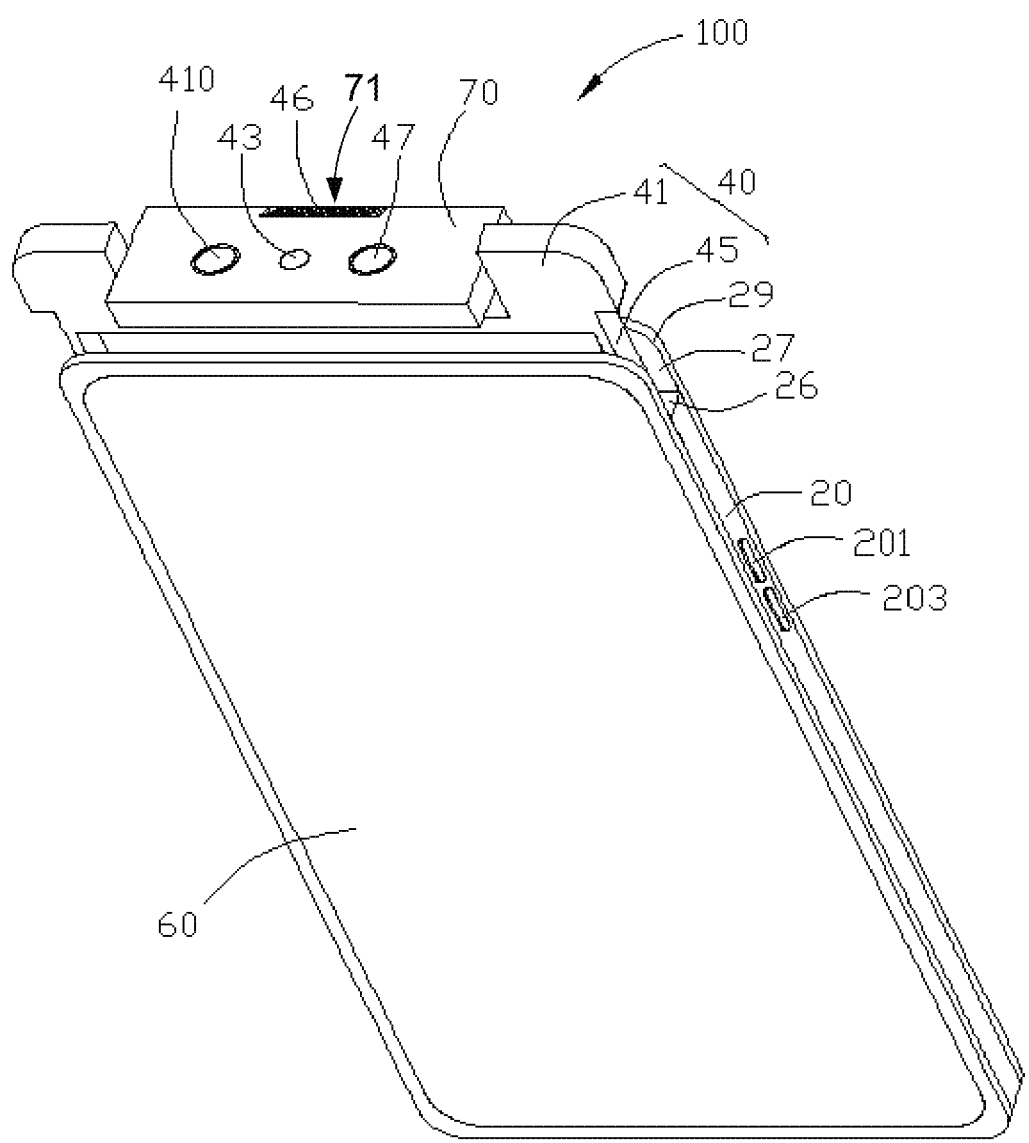
FIG. 1 is a three-dimensional structural view according to a first embodiment of an electronic apparatus of the present disclosure.
Figure 2:
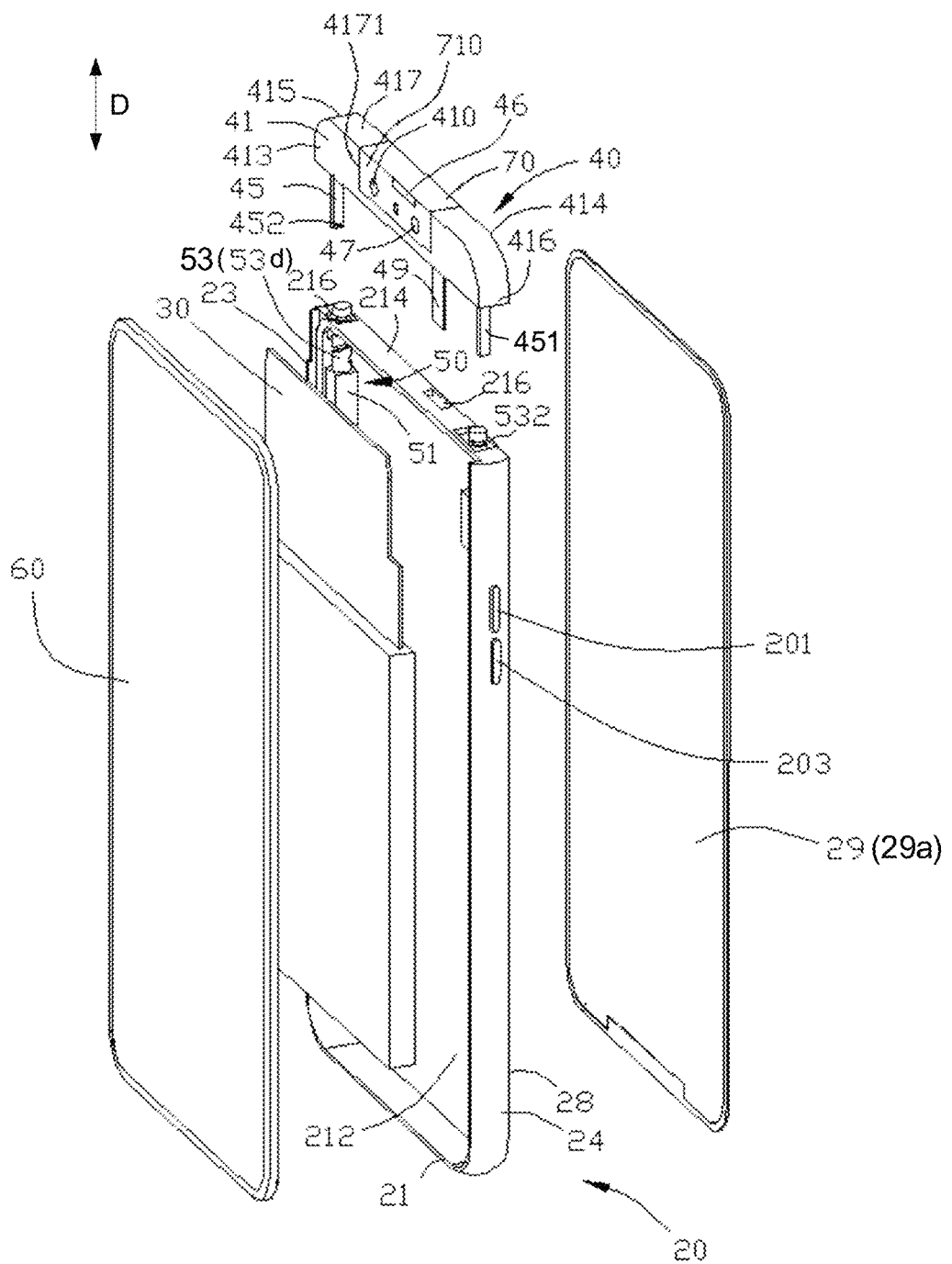
FIG. 2 is an exploded three-dimensional structural view of FIG. 1 shown in another viewing angle.
Figure 3:
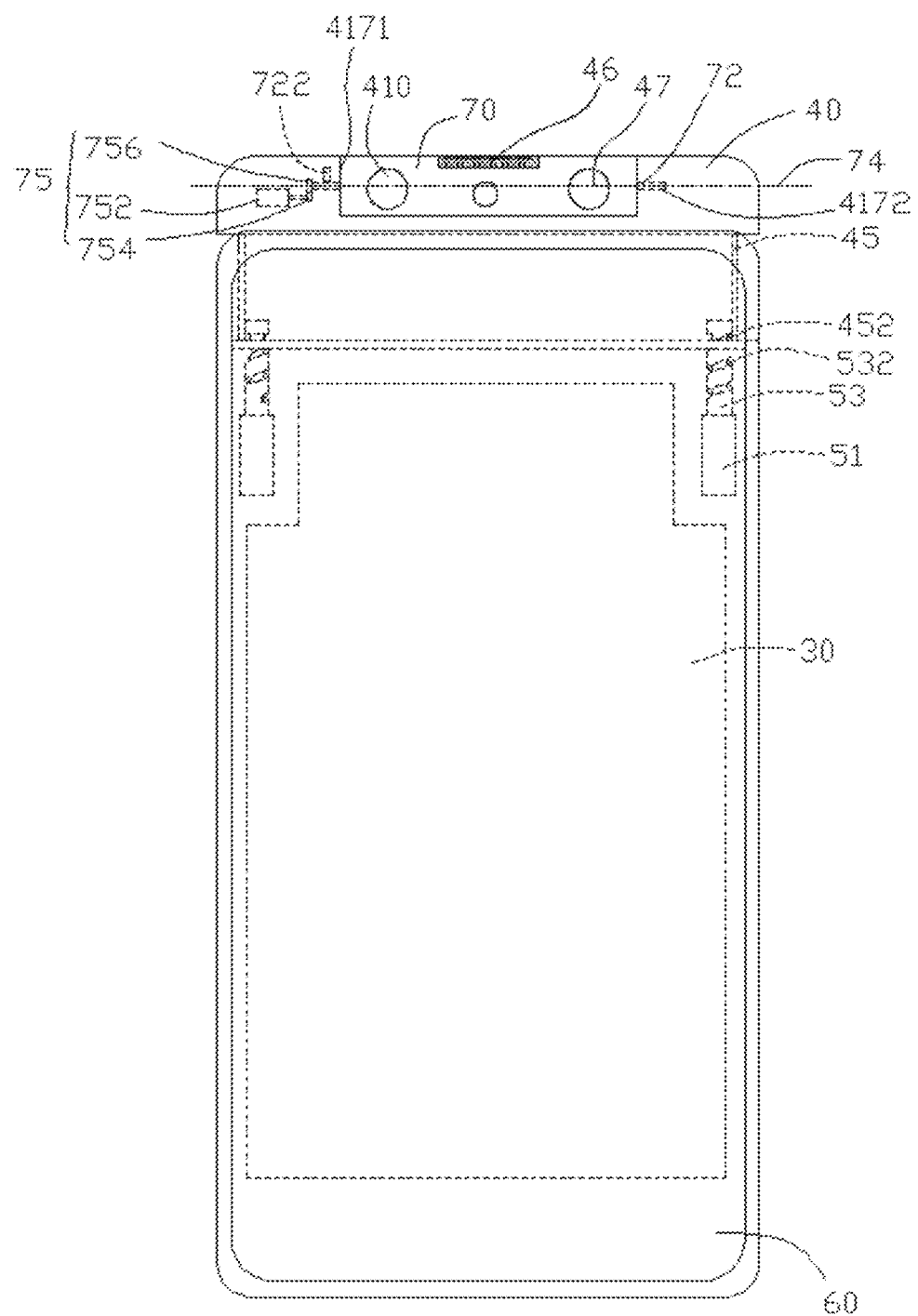
FIG. 3 is a view showing a front face according to the first embodiment of the electronic apparatus of the present disclosure.

Reference is now made to FIG. 1 which is a three-dimensional structural view according to a first embodiment of an electronic apparatus of the present disclosure, FIG. 2 which is an exploded three-dimensional structural view of FIG. 1 shown in another viewing angle, and FIG. 3 which is a view showing a front face according to the first embodiment of the electronic apparatus of the present disclosure. The present disclosure provides an electronic apparatus 100, including: a housing 20, a mainboard 30 provided within the housing 20, and a first display screen 60 connected to the mainboard 30, The housing 20 includes a front side face 21, a left side face 23 and a right side face 24 opposite to each other, and a top face 26. The first display screen 60 is provided on the front side face 21 of the housing 20. A storage groove 27 is defined on the top face 26 of the housing 20 in a left-right direction (e.g., a horizontal direction parallel to the front side face 21). Two opposite ends of the storage groove 27 penetrate through the left side face 23 and the right side face 24 of the housing 20, respectively. The electronic apparatus 100 further includes a mounting frame 40, and a rotating box 70 is rotatably connected to the mounting frame 40. The rotating box 70 is provided with a camera 410 connected to the mainboard 30. The mounting frame 40 can protrude out of or retract into the storage groove 27 to drive the rotating box 70 to move out of or into the storage groove 27, such that the camera 410 is exposed out of or hidden into the housing 20. The first display screen 60 and the camera 410 make electrical connection and signal connection to the mainboard 30. In this embodiment, the electronic apparatus 100 may be a mobile terminal or a mobile phone. In other embodiments, the electronic apparatus may be, but may not be limited to, a satellite or a cellular phone; a personal communication system (PCS) terminal that can combine cellular radiotelephone with data processing, fax, and data communication capabilities. The electronic apparatus may include a radiotelephone, a pager, an internet/intranet access, a web browser, a notepad, a calendar, and/or a global positioning system (GPS) receiver personal digital assistant (PDA), and a conventional laptop, and/or a palmtop receiver or other electronic apparatuses including radiotelephone transceivers.

In the present embodiment, the housing 20 is a middle frame of the electronic apparatus 100, and the storage groove 27 is defined on a top face of the middle frame and penetrates through a left side face and a right side face of the middle frame in a left-right direction. The electronic apparatus 100 further includes a first driving device 75 for driving the rotating box 70 to rotate, and a second driving device 50 for driving the mounting frame 40 to protrude and retract. In the present disclosure, the front side face of the housing 20 refers to a face facing the display screen 60, and the rear side face of the housing refers to a face facing away from the display screen 60.

In the present disclosure, the top face 26 of the housing 20 of the electronic apparatus 100 defines the storage groove 27 at a rear side of the display screen 60. The second driving device 50 drives the mounting frame 40 to protrude out of or retract into the storage groove 27, such that the camera 410 on the rotating box 70 is exposed out of or hidden into the housing 20. The first driving device 75 drives the rotating box 70 to rotate, such that the camera 410 on the rotating box 70 can shoot at any angle, to facilitate using the camera. That is, when the camera 410 is required to be used, firstly, the second driving device 50 drives the mounting frame 40 to protrude out of the storage groove 27, and secondly, the first driving device 75 drives the rotating box 70 to rotate, such that the camera 410 directly faces an object to be shot. When the camera 410 is not required to be used, firstly, the first driving device 75 drives the rotating box 70 to rotate for resetting, and secondly, the second driving device 50 drives the mounting frame 40 to retract into the storage groove 27. Since the camera 410 is provided on the rotating box 70 and the rotating box 70 can be received within the storage groove 27 along with the mounting frame 40, the camera 410 does not occupy an area of the display screen 60 of the electronic apparatus 100, thereby making it possible to increase a screen ratio of the electronic apparatus 100 up to 85% or more, even up to 95% or more, and thus improving the visual experience. Further, the camera 410 of the mobile 100 can be used only if the mounting frame 40 protrudes out of the storage groove 27, which can prevent other person from malignantly initiating, the camera 410 of the electronic apparatus 100 remotely to carry out image acquisition to give away user privacy unintentionally, thereby to improve safety of the electronic apparatus 100.

The housing 20 further includes a back panel 29 provided on the rear side face 28 thereof. An orthogonal projection of a top face of the back panel 29 on the rear side face of the first display screen 60 may be located below the top face of the first display screen 60. The top of the housing 20 encloses the storage groove 27 between the first display screen 60 and the back panel 29. In the present embodiment, the back panel 29 is a second display screen 29a provided at the rear side face 28 of the housing 20. The second display screen 29a can be a whole or part of the back panel 29. The second display screen 29a makes electrical connection and signal connection to the mainboard 30, i.e., the electronic apparatus 100 is a dual-screen mobile phone. A top face of the second display screen 29a may be flush with the top face of the first display screen 60. The top of the housing 20 encloses the storage groove 27 between the first display 60 and the second display screen 29a. The mounting frame 40 is slidably received within the storage groove 27 in a direction parallel to the first display screen 60.

A first operation press-key 201 for controlling the first driving device 75 and a second operation press-key 203 for controlling the second driving device 50 are further provided on the right side face 24 of the housing 20, i.e., by pressing the second operation press-key 203, it is possible for the second driving device 50 to drive the mounting frame 40 to protrude out of or retract into the storage groove 27; and by pressing the first operation press-key 201, it is possible for the first driving device 75 to drive the rotating box 70 to rotate. In the present embodiment, by pressing the first operation press-key 201, it is possible for the first driving device 75 to drive the rotating box 70 to rotate by 180 degrees, i.e., it is possible to orient the camera 410 on the rotating box 70 to the front side face of the first display screen 60 or to the rear side face of the housing 20.

An accommodating space 212 for accommodating electronic components such as the mainboard 30 and battery is defined in the middle of the housing 20; and a connecting plate 214 is provided within the housing 20 between the accommodating space 212 and the storage groove 27, i.e., the connecting plate 214 is a bottom plate of the storage groove 27. The connecting plate 214 defines a plurality of through holes 216 in communication with the accommodating space 212.

The mounting frame 40 includes a connecting box 41 and at least one connecting member 45 connected to the connecting box 41. The connecting box 41, which is used for connecting the rotating box 70, includes a front side face 413 facing the first display screen 60, a rear side face 414 facing the second display screen 29a, a left side face 415 and a right side face 416 opposite to each other, and a top face 417. The connecting box 41 defines an accommodating opening 4171 which penetrates through the front side face 413 and the rear side face 414 of the connecting box 41. The rotating box 70 is rotatably accommodated within the accommodating opening 4171. The rotating box 70 includes a front side face 710. When the rotating box 70 is accommodated within the accommodating opening 4171, the front side face 710 is parallel to the front side face 413 or the rear side face 414 of the connecting box 41. The camera 410 is provided on the front side face 710 of the rotating box 70. The rotating box 70 is further provided with an earpiece 46 connected to the mainboard 30. The earpiece 46 and the camera 410 are located on a same side face of the rotating box 70 and are arranged in a staggered manner, i.e., the earpiece 46 and the camera 410 do not overlap within the rotating box 70 in a front-back direction. The front side face 710 of the rotating box 70 is further provided with a flash 43 connected to the mainboard 30 and a photosensitive element 47. The camera 410, the flash 43, the earpiece 46, and the photosensitive element 47 all are configured on the rotating box 70 in a staggered manner, which facilitates reducing a thickness of the mounting frame 40, thereby making it possible to reduce an overall thickness of the electronic apparatus 100. The camera 410, the flash 43, the earpiece 46, and the photosensitive element 47 are connected to the mainboard 30 through one of the through holes 216 of the housing 20 by means of a data wire 49, thereby enabling the electronic components to make electrical connection and signal connection to the mainboard 30. In the present embodiment, the earpiece 46 is located on a top of the camera 410, i.e., the earpiece 46 is adjacent to the top face of the rotating box 70. When the rotating box 70 moves into the storage groove 27 and the front side face 710 of the rotating box 70 is adjacent to the front side face 413 of the connecting box 41, the earpiece 46 is adjacent to the top face of the first display screen 60.

The accommodating opening 4171 is defined on the top face 417 of the connecting box 41 of the mounting frame 40. Two opposite left and right end walls of the rotating box 70 each are provided with a rotating shaft 72. The axis lines of the two rotating shafts 72 align with a rotating axis 74 which extends in a left-right direction. The two rotating shafts 72 of the mounting frame 40 corresponding to the rotating box 70 define two shaft holes 4172. The two rotating shafts 72 each are rotatably connected to within the two shaft holes 4172, i.e., the two shaft holes 4172 each are defined on the two opposite left and right end walls of the accommodating opening 4171 of the connecting box 41. The rotating box 70 defines, at a location adjacent to the earpiece 46, a gap 71 in communication with the earpiece 46. After the rotating box 70 moves into the storage groove 27, sounds of the earpiece 46 can also be transmitted from the gap 71, i.e., the electronic apparatus 100 may use the earpiece 46 without requiring the mounting frame 40 to protrude out of the storage groove 27. A positioning member 722 is provided between the rotating box 70 and the mounting frame 40, and is used for positioning the rotating box 70 to rotate to any angle.

The positioning member 722 is a wave bead screw (also named as positioning bead screw, steel ball tight, or spring plunger) provided within the mounting frame 40 and corresponding to one of the rotating shafts 72. An outer peripheral face of the one of the rotating shafts 72 defines an array of positioning holes along a circumference of the rotating axis 74. Steel balls of the wave bead screw may be clamped into these positioning holes. The number of the defined positioning holes can be determined as actually required. For example, two of the positioning holes are arrayed on the one of the rotating shafts 72, and an included angle between the two positioning holes is 180 degrees, such that the wave bead screw positions the rotating box 70 to a position of 0 degree or to a position of 180 degrees. For example, four of the positioning holes are arrayed on the one of the rotating shafts 72, and an included angle between every two adjacent positioning holes of the positioning holes is 90 degrees, such that the wave bead screw positions the rotating box 70 to rotate to a position of 0 degree, a position of 90 degrees, a position of 180 degrees, or a position of 270 degrees. For example, six of the positioning holes are arrayed on the one of the rotating shafts 72, and an included angle between every two adjacent positioning holes of the positioning holes is 60 degrees, such that the wave bead screw positions the rotating box 70 to rotate to a position of 0 degree, a position of 60 degrees, a position of 120 degrees, a position of 180 degrees, a position of 240 degrees, a position of 300 degrees, or a position of 360 degrees. In the present embodiment, two of the positioning holes are arrayed on the one of the rotating shafts 72, and an included angle between the two positioning holes is 180 degrees, i.e., when the camera 410 is oriented to the front side face of the rear side face of the electronic apparatus, the wave bead screw positions the rotating box 70.

In the present embodiment, the first driving device 75 includes a driving member 752 provided within the mounting frame 40 and connected to the mainboard 30, a driving gear 754 provided on the driving member 752, and a driven gear 756 connected to one of the rotating shafts 72 and engaging with the driving gear 754. The driving member 752 makes electrical connection and signal connection to the mainboard 30. The driving member 752 drives the driving gear 754 to rotate to drive the driven gear 756 to rotate, such that the rotating box 70 rotates along the rotating axis 74, until the positioning member 722 is clamped into a corresponding positioning hole.

In other embodiments, the first driving device 75 includes a driving member provided within the mounting frame 40 and connected to the mainboard 30, and a transmission shaft extending in a direction of the rotating axis 74 and connected between the driving member and one of the rotating shafts 72 of the rotating box 70. The driving member makes electrical connection and signal connection to the mainboard 30. The driving member drives the transmission shaft to rotate to drive the rotating box 70 to rotate along the rotating axis, until the positioning member 722 is clamped into a corresponding positioning hole.

In other embodiments, two opposite left and right end walls of the rotating box 70 each define a shaft hole. The axis lines of the two shaft holes are located on a same rotating axis. The rotating axis extends in a left-right direction, i.e., the axis lines of the two shaft holes align with the rotating axis. The two shaft holes on the connecting box 41 of the mounting frame 40, corresponding to the rotating box 70, are provided with two transmission shafts which respectively are rotatably connected to within the two shaft holes.

In other embodiments, the rotating box 70 can also be rotated manually.

In the present embodiment, the number of the at least one connecting member 45 is two; the two connecting members 45 are provided at a left end and a right end of a bottom face of the connecting box 41, respectively; and each of the connecting members 45 includes an extension strip 451 extending outwardly from the bottom face of the connecting box 41 and a protrusion 452 protruding at an end of the extension strip 451 in a direction perpendicular to the extending direction of the extension strip 451. The second driving device 50 includes two driving members 51 fixed within the housing 20 and connected to the mainboard 30, and a transmission member 53 provided on each of the driving members 51. Each of the transmission members 53 is a transmission rod 53*d* extending in the protruding-retracting direction D of the connecting box 41 and passing through a corresponding through hole 216. An outer peripheral wall of each transmission rod 53*d* defines a spiral slot 532 in the protruding-retracting direction D of the connecting box 41. The protrusions 452 of the two connecting members 45 are slidably fitted onto the spiral slots 532 of the two transmission rods 53*d*, respectively. The two driving members 51 make electrical connection and signal connection to the mainboard 30. The two driving members 51 drive the two transmission members 53 to rotate respectively to drive the protrusion 452 of each of the connecting members 45 to slide along a corresponding spiral slot 532, such that each of the connecting members 45 extends into or retreats out of a corresponding through hole 216 so as to drive the connecting box 41 to protrude out of or retract into the storage groove 27.

Figure 4:
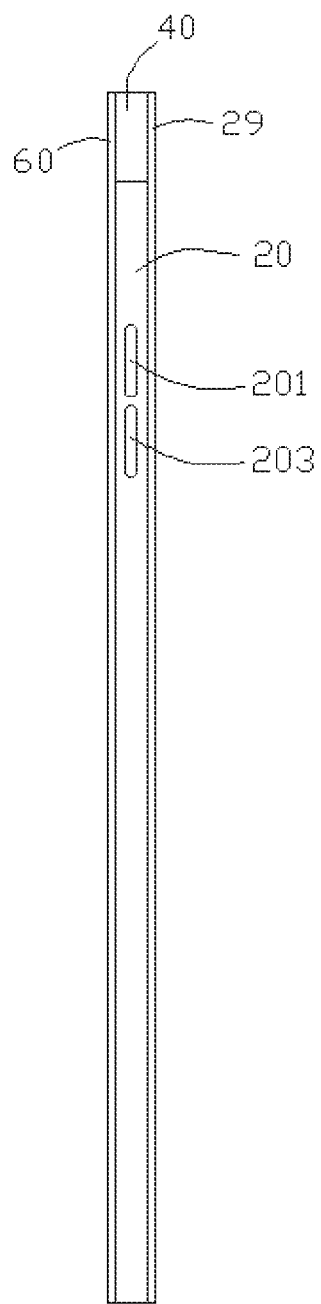
FIG. 4 is a view showing a side face according to the first embodiment of the electronic apparatus of the present disclosure.
Figure 5:
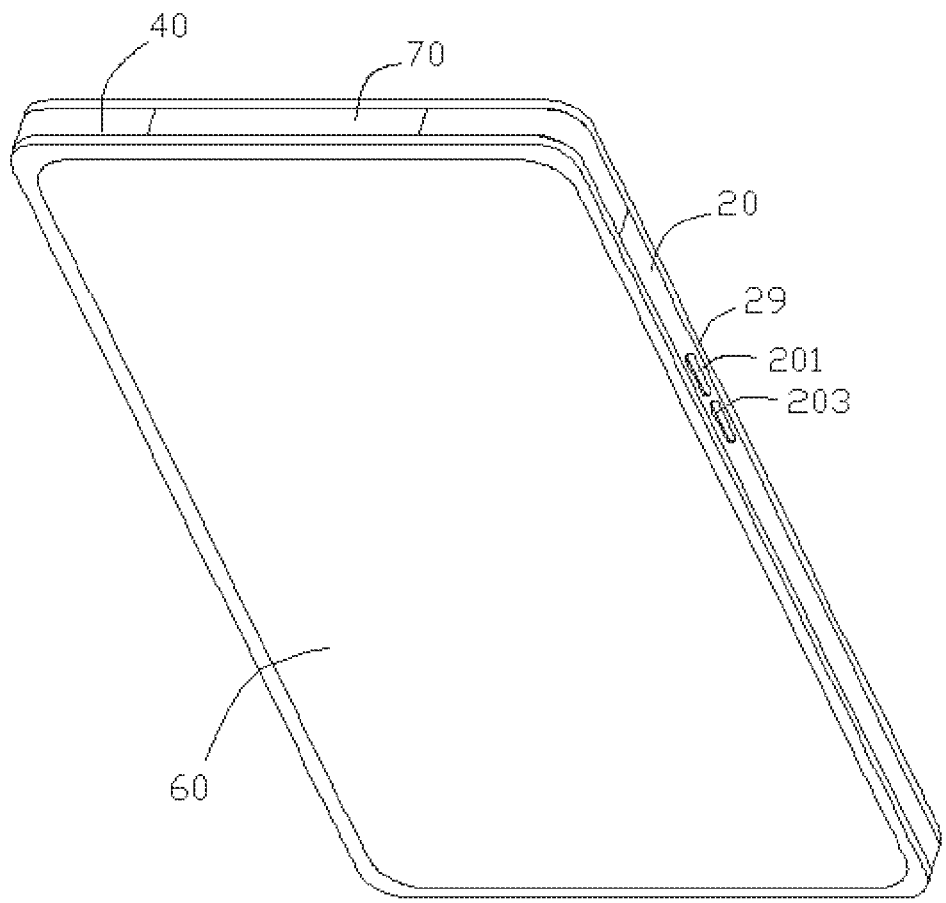
FIG. 5 is a view showing one of use statuses according to the first embodiment of the electronic apparatus of the present disclosure.

Reference is now made to FIGS. 1-5, wherein FIG. 4 is a view showing a side face according to the first embodiment of the electronic apparatus of the present disclosure, and FIG. 5 is a view showing one of use statuses according to the first embodiment of the electronic apparatus of the present disclosure. When there is a need to use the camera 410 for photographing or there is a need to use the earpiece 46 to answer the call, the second operation press-key 203 is pressed to send a triggering signal to a controller on the mainboard 30. The controller receives the triggering signal and controls the two driving members 51 to drive the two transmission members 53 to rotate, so that the protrusion 452 of each of the connecting members 45 slides along a corresponding spiral slot 532 to drive the each connecting member 45 to slide in the protruding-retracting direction D of the connecting box 41, such that the connecting box 41 moves out of the storage groove 27, until the rotating box 70 is exposed out of the housing 20. The two driving members 51 stop driving the two transmission members 53 to rotate. The connecting box 41 is positioned outside the housing 20. The first operation press-key 201 is pressed to send a triggering signal to a controller on the mainboard 30. The controller receives the triggering signal and controls the driving member 752 to drive the driving gear 754 to rotate thereby to drive the driven gear 756 to rotate, so that the rotating box 70 rotates along the rotating axis 74 to a desired position. It is applicable for the positioning member 722 to be clamped into a corresponding positioning hole, thereby facilitating the user in using the camera 410, the earpiece 46 or the like.

When the connecting box 41 needs to be received, the first operation press-key 201 is pressed to send a triggering signal to a controller on the mainboard 30. The controller receives the triggering signal and controls the driving member 752 to drive the driving gear 754 to rotate in an opposite direction so as to drive the driven gear 756 to rotate, so that the rotating box 70 rotates to be reset along the rotating axis 74, and the rotating box 70 is received within the accommodating opening 4171. The second operation press-key 203 is further pressed to send a triggering signal to the controller on the mainboard 30. The controller receives the triggering signal and controls the driving member 51 to drive the two transmission members 53 to rotate in opposite directions so as to drive each of the connecting members 45 to slide into a corresponding through hole 216 in the protruding-retracting direction D of the connecting box 41, so that the connecting box 41 moves into the storage groove 27, until both the camera 410 and the earpiece 46 are hidden within the storage groove 27, and the two driving members 51 stop driving the two transmission members 53 to rotate. At this time, both the connecting box 41 and the rotating box 70 are positioned within the storage groove 27 of the housing 20; the left side face 415 of the connecting box 41 is flush with the left side face 23 of the housing 20; the right side face 416 of the connecting box 41 is flush with the right side face 24 of the housing 20; and the top face 417 of the connecting box 41 and the top face of the rotating box 70 are flush with the top face of the first display screen 60.

The storage groove 27 is defined on the top face 26 of the housing 20 of the electronic apparatus 100 of the present disclosure, and is located between the first display screen 60 and the second display screen 29a. The connecting box 41 is slidably received within the storage groove 27. The controller on the mainboard 30 can control the second driving device 50 to drive the connecting box 41 to protrude out of or retract into the storage groove 27, and control the first driving device 75 to drive the rotating box 70 to rotate, so that such electronic components as the camera 410, the flash 43, the earpiece 46 and the photosensitive element 47 on the connecting box 41 are exposed out of or hidden into the storage groove 27. Since the electronic components all are provided on the connecting box 41, they do not occupy the areas of the first display screen 60 and the second display screen 29a of the electronic apparatus 100, thereby making it possible to increase a screen ratio of the electronic apparatus 100. Moreover, the rotating box 70 can rotate to any position to facilitate the user in using the camera 410.

In other embodiments, the operation press-keys can be two touch icons provided on the first display screen 60 or the second display screen 29a. One of the touch icons can be clicked to send a triggering signal to a controller on the motherboard 30. The controller receives the triggering signal and controls the two driving members 51 to drive the two transmission members 53 to rotate; and the other touch icon can be clicked to send a triggering signal to a controller on the motherboard 30. The controller receives the triggering signal and controls the driving member 752 to drive the rotating box 70 to rotate.

Figure 6:
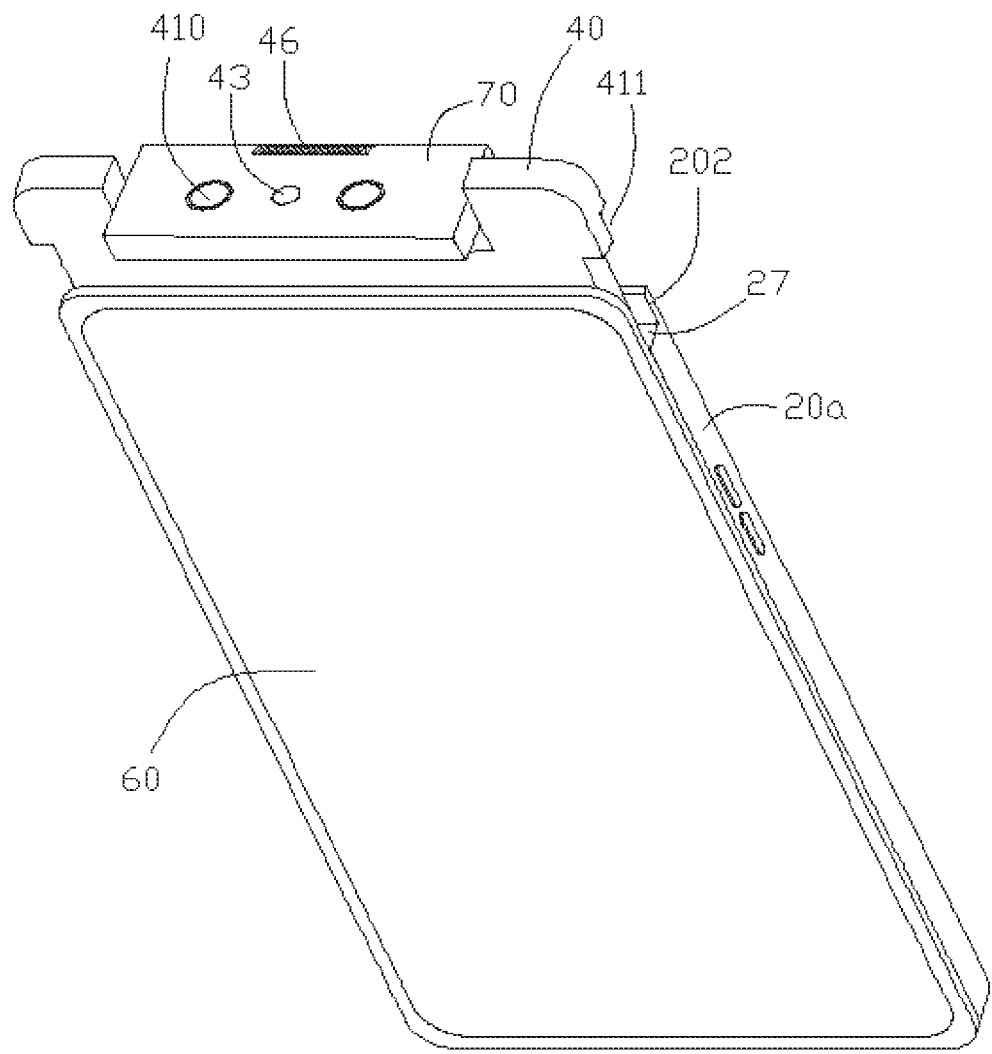
FIG. 6 is a three-dimensional structural view according to a second embodiment of the electronic apparatus of the present disclosure.
Figure 7:
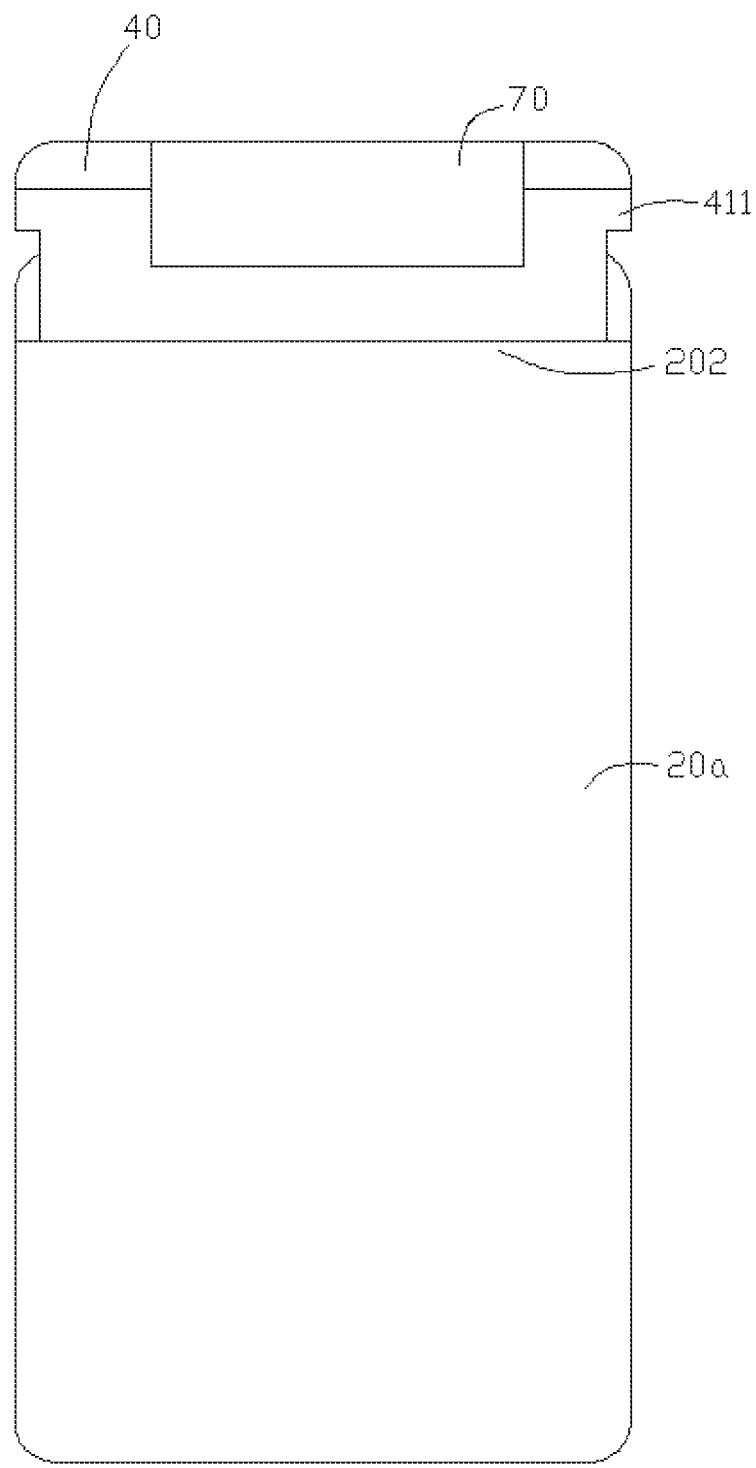
FIG. 7 is a view showing a back face according to the second embodiment of the electronic apparatus of the present disclosure.
Figure 8:
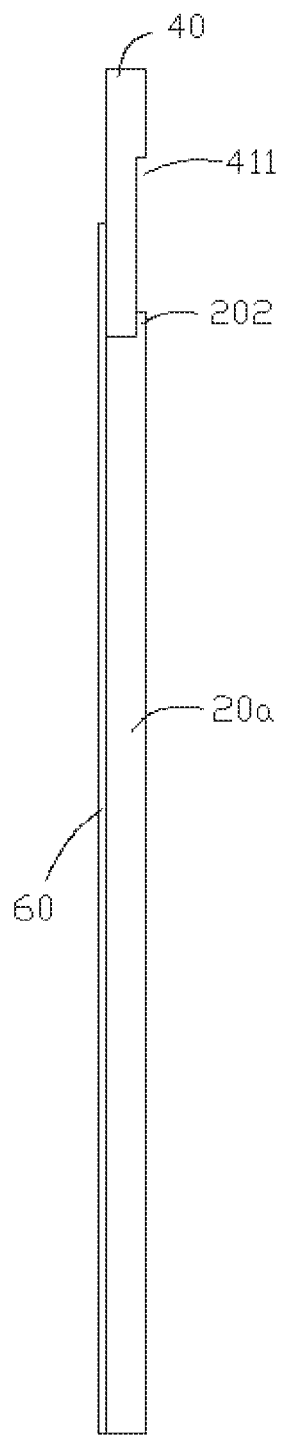
FIG. 8 is a view showing a side face according to the second embodiment of the electronic apparatus of the present disclosure.

Reference is now made to FIG. 6 which is a three-dimensional structural view according to a second embodiment of the electronic apparatus of the present disclosure, FIG. 7 which is a view showing a back face according to the second embodiment of the electronic apparatus of the present disclosure, and FIG. 8 which is a view showing a side face according to the second embodiment of the electronic apparatus of the present disclosure. The structure of the second embodiment of the electronic apparatus is similar to that of the first embodiment, and the difference therebetween lies in that: in the second embodiment, a housing 20a is integrally formed by a middle frame and a back panel; a top face of the housing 20a defines, in a left-right direction, a storage groove 27 penetrating through two opposite left and right side faces of the housing 20a. A flange 202 is provided at the top face of the housing 20a adjacent to the rear side face, and extends in a left-right direction. The flange 202 and the display screen 60 enclose the storage groove 27. An accommodating slot 411 is defined at the bottom of the side face of the mounting frame 40 facing away from the display screen 60. When the mounting frame 40 retracts into the storage groove 27, the flange 202 is accommodated within the accommodating slot 411.

Figure 9:
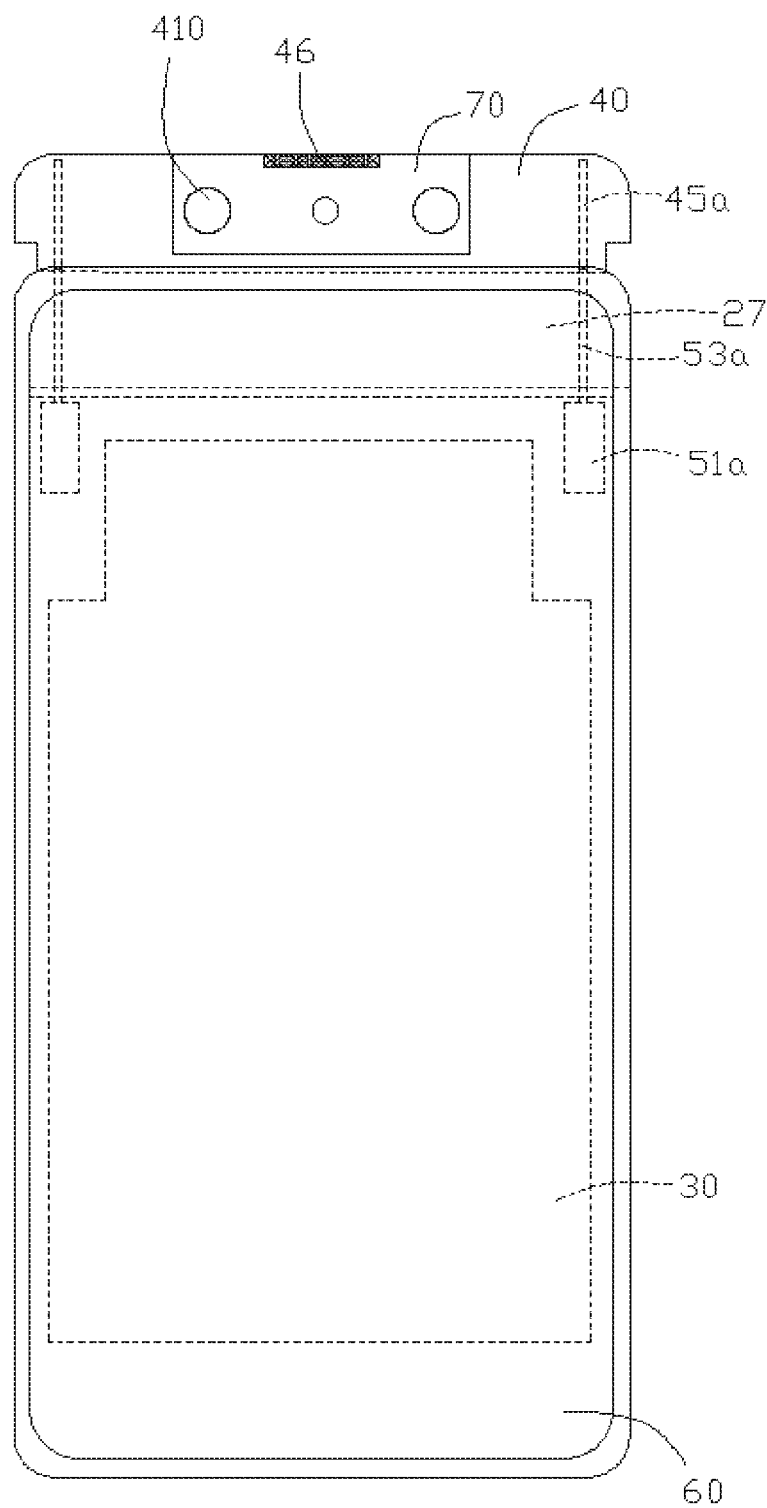
FIG. 9 is a structural view according to a third embodiment of the electronic apparatus of the present disclosure.

Reference is now made to FIG. 9 which is a structural view according to a third embodiment of the electronic apparatus of the present disclosure. The structure of the third embodiment of the electronic apparatus is similar to that of the first embodiment, and the difference therebetween lies in that: the driving device of the electronic apparatus of the third embodiment is different from the driving device of the electronic apparatus of the first embodiment, includes two motors 51a fixed within the housing 20 and connected to the mainboard 30, and a screw 53a connected to each of the motors 51a. Each of the screws 53a extends in the protruding-retracting direction D of the mounting frame 40. The mounting frame 40 defines two screw holes 45a respectively screwed to the two screws 53a. The two motors 51a make electrical connection and signal connection to the mainboard 30. The mainboard 30 controls the two motors 51a to drive the two screws 53a to rotate, thereby driving the mounting frame 40 to protrude out of or retract into the storage groove.

In other embodiments, the driving device includes a motor 51a fixed within the housing 20 and making electrical connection and signal connection to the mainboard 30, and a screw 53a connected to the motor 51a. The screw 53a extends in the protruding-retracting direction D of the mounting frame 40. The mounting frame 40 defines a screw hole 45a screwed to the screw 53a, and the mainboard 30 controls the motor 51a to drive the screw 53a to rotate, thereby to drive the mounting frame 40 to protrude out of or retract into the storage groove 27.

Figure 10:
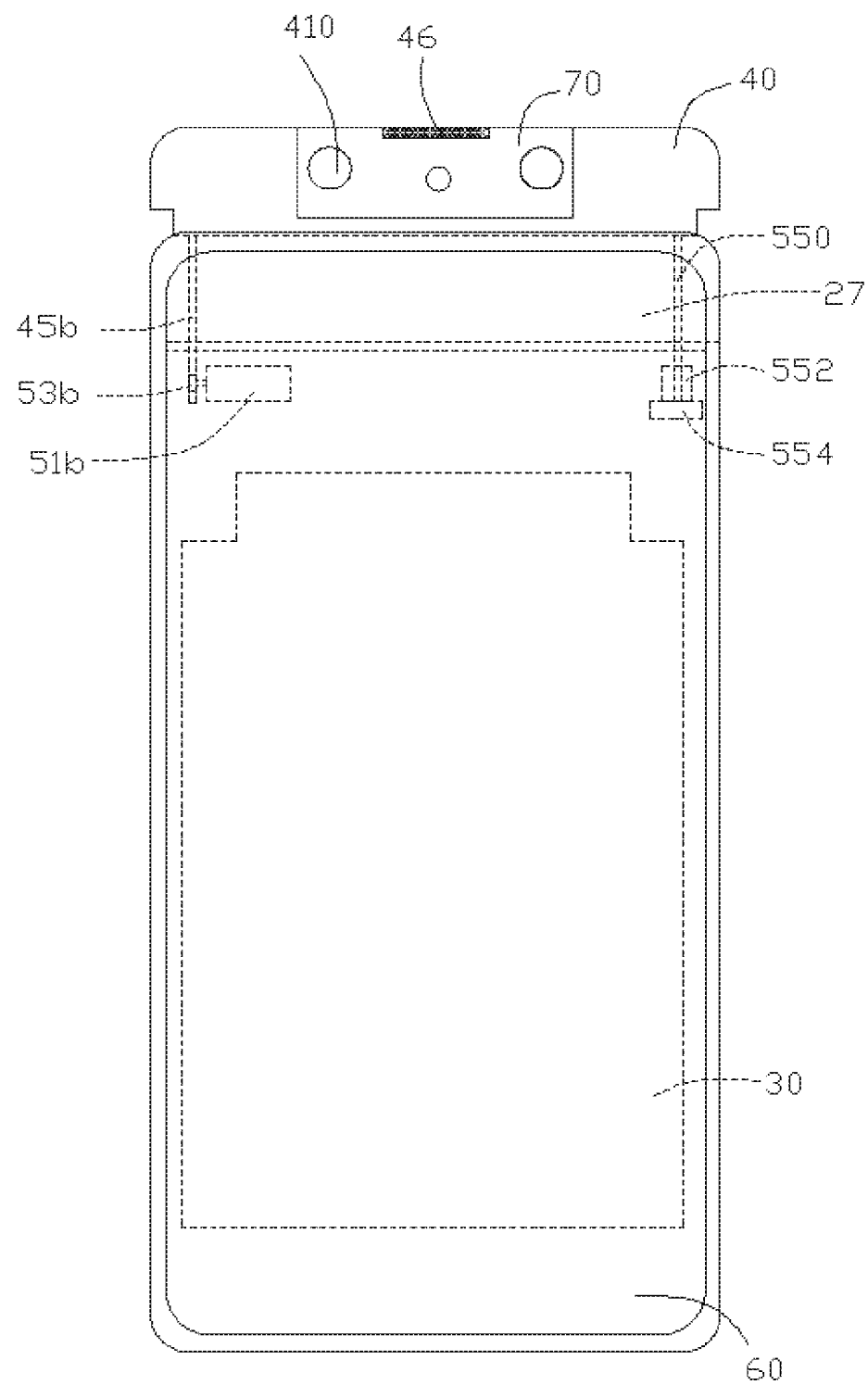
FIG. 10 is a structural view according to a fourth embodiment of the electronic apparatus of the present disclosure.

Reference is now made to FIG. 10 which is a structural view according to a fourth embodiment of the electronic apparatus of the present disclosure. The structure of the fourth embodiment of the electronic apparatus is similar to that of the first embodiment, and the difference therebetween lies in that: the driving device of the electronic apparatus of the fourth embodiment, which is different from the driving device of the electronic apparatus of the first embodiment, includes a motor 51b fixed within the housing 20 and connected to the mainboard 30, a driving gear 53b connected to the motor 51b, and a rack 45b connected to the mounting frame 40 and extending in a protruding-retracting direction D of the mounting frame 40. The motor 51b makes electrical connection and signal connection to the mainboard 30. The driving gear 53b engages with the rack 45b, and the motor 51b drives the driving gear 53b to rotate to drive the rack 45b to slide, such that the mounting frame 40 protrudes out of or retracts into the storage groove 27.

In the fourth embodiment, a guide mechanism is further provided between the housing 20 and the mounting frame 40, and includes: a guide post 550 extending in the protruding-retracting direction D of the mounting frame 40, a positioning block 552 provided within the housing 20 and corresponding to the guide post 550, and a stop block 554 provided at an end of the guide post 550 away from the mounting frame 40. The positioning block 552 defines a guide hole in the protruding-retracting direction D of the mounting frame 40. The guide post 550 is slidably inserted into the guide hole. In the process that the mounting frame 40 protrudes out of or retracts into the storage groove 27, the guide post 550 slides along the guide hole of the positioning block 552, and the stop block 554 can be provided at an end of the positioning block 552 away from the mounting frame 40, thereby preventing the mounting frame 40 from being detached from the housing 20.

Figure 11:
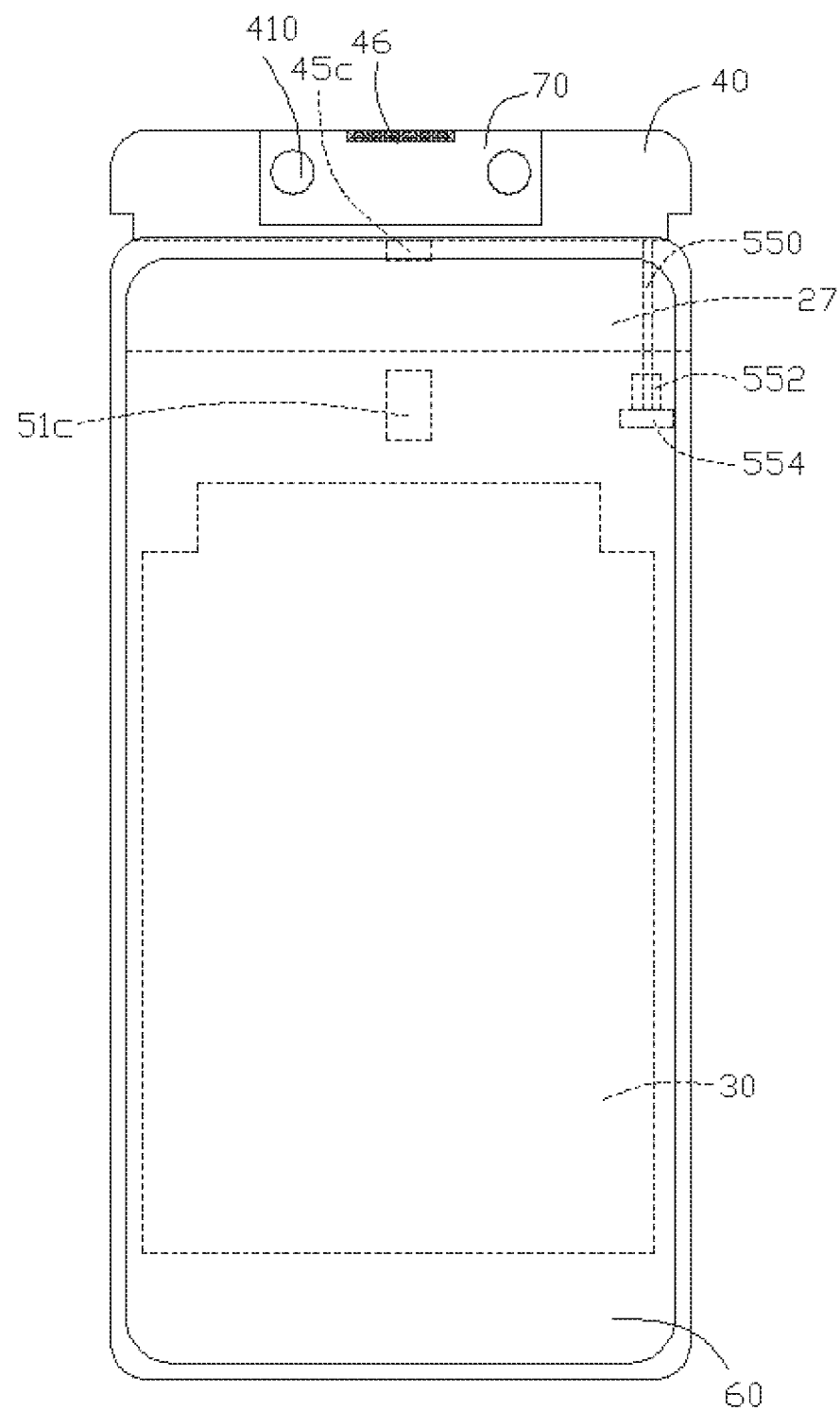
FIG. 11 is a structural view according to a fifth embodiment of the electronic apparatus of the present disclosure.

Reference is now made to FIG. 11 which is a structural view according to a fifth embodiment of the electronic apparatus of the present disclosure. The structure of the fifth embodiment of the electronic apparatus is similar to that of the fourth embodiment, and the difference therebetween lies in that: the driving device of the electronic apparatus of the fifth embodiment, which is different from that of the electronic apparatus of the fourth embodiment, includes an electromagnet 51c fixed in the housing 20 and connected to the mainboard 30, and a magnet 45c provided on the mounting frame 40 and corresponding to the electromagnet 51c. The electromagnet 51c makes electrical connection and signal connection to the mainboard 30. When the mounting frame 40 is required to protrude out of the storage groove 27, the mainboard 30 supplies power to the electromagnet 51c, so that magnetic poles between the electromagnet 51c and the magnet 45c are identical and mutually repelled, thereby making it possible to drive the mounting frame 40 to protrude out of the storage groove 27; and when the mounting frame 40 is required to retract into the storage groove 27, the mainboard 30 supplies power to the electromagnet 51c and changes the power supply direction, such that magnetic poles between the electromagnet 51c and the magnet 45c are different and attract each other, thereby driving the mounting frame 40 to retract into the storage groove 27.

In the process that the mounting frame 40 protrudes out of or retracts into the storage groove 27, the guide post 550 slides along the guide hole of the positioning block 552, and the stop block 554 can be provided at an end of the positioning block 552 away from the mounting frame 40 to prevent the mounting frame 40 from being detached from the housing 20.

In other embodiments, the magnet 45c according to the fifth embodiment may also be replaced by an electromagnet electrically connected to the mainboard 30. The mainboard 30 supplies electric power to two electromagnets and can change the power supply direction, so that magnetic poles between the two electromagnets are identical or different, thereby driving the mounting frame 40 to protrude out of or retract into the storage groove 27.

Figure 12:
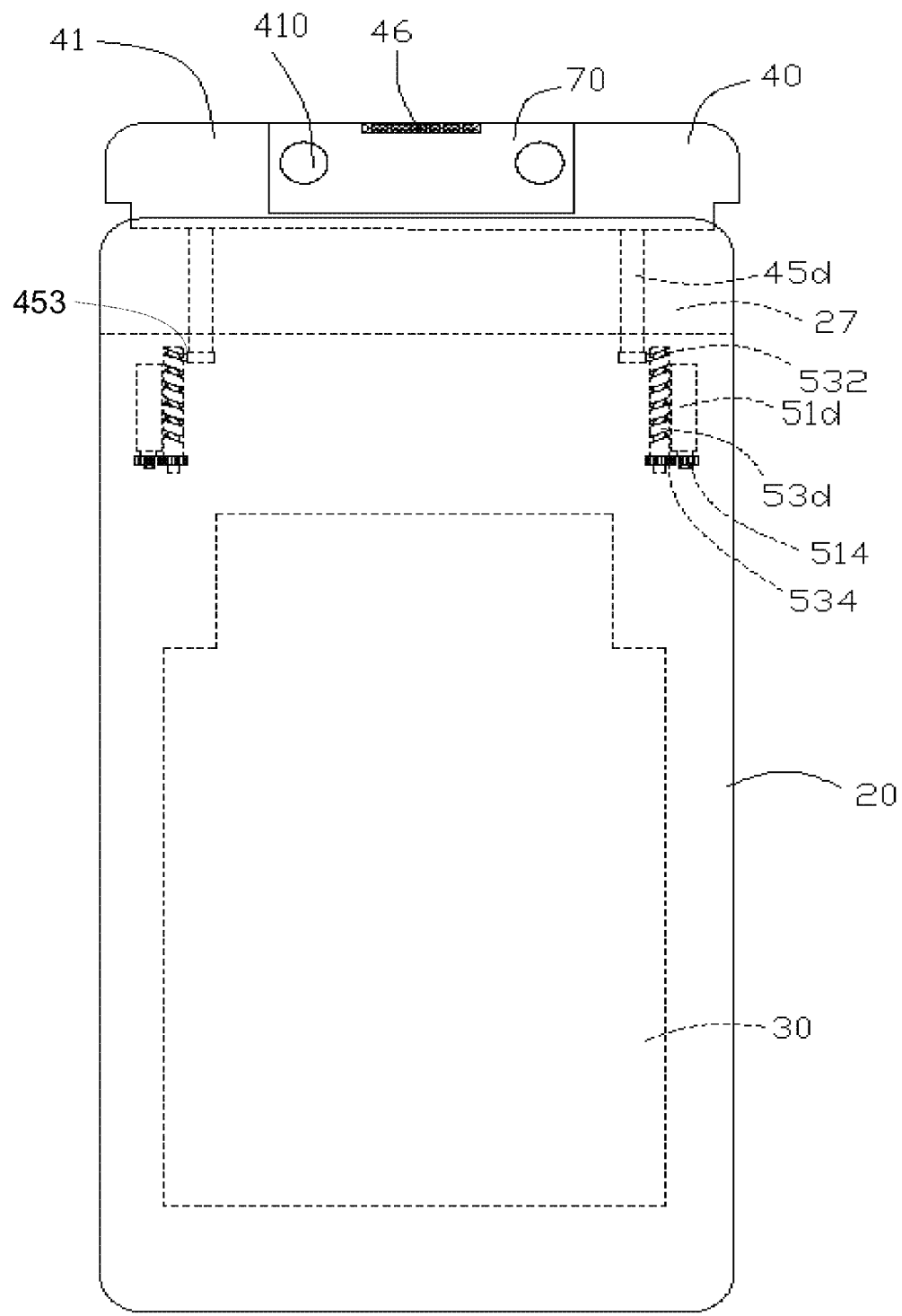
FIG. 12 is a structural view according to a sixth embodiment of the electronic apparatus of the present disclosure.

Reference is now made to FIG. 12 which is a structural view according to a sixth embodiment of the electronic apparatus of the present disclosure. The structure of the sixth embodiment of the electronic apparatus is similar to that of the first embodiment, and the difference therebetween lies in that: the driving device of the electronic apparatus according to the sixth embodiment, which is different from the driving device of the electronic apparatus according to the first embodiment, includes two motors 51d fixed within the housing 20 and connected to the mainboard 30, a driving gear 514 connected to each of the motors 51d, and a transmission rod 53d adjacent to each of the motors 51d and extending in the protruding-retracting direction D of the connecting box 41, and a connecting rod 45d adjacent to each of the transmission rods 53d and sliding in the protruding-retracting direction D of the connecting box 41. An end of each of the transmission rods 53d is provided with a driven gear 534 which engages with the driving gear 514 on a corresponding motor 51d. An outer peripheral wall of each of the transmission rods 53d defines a spiral slot 532 in the protruding-retracting direction D of the connecting box 41. A top of each of the connecting rods 45d is connected to the connecting box 41, and a bottom of each of the connecting rods 45d is provided with a sliding block 453 slidably accommodated within the spiral slot 532 of a corresponding transmission rod 53d. The two motors 51d make electrical connection and signal connection to the mainboard 30. The mainboard 30 controls the two motors 51d to drive the driving gear 514 to rotate thereby to drive the corresponding driven gear 534 to rotate, such that each of the transmission rods 53d rotates to drive the sliding block 453 of the corresponding connecting rod 45d to slide along the corresponding spiral slot 532 to drive the mounting frame 40 to protrude out of or retract into the storage groove 27.

Figure 13:
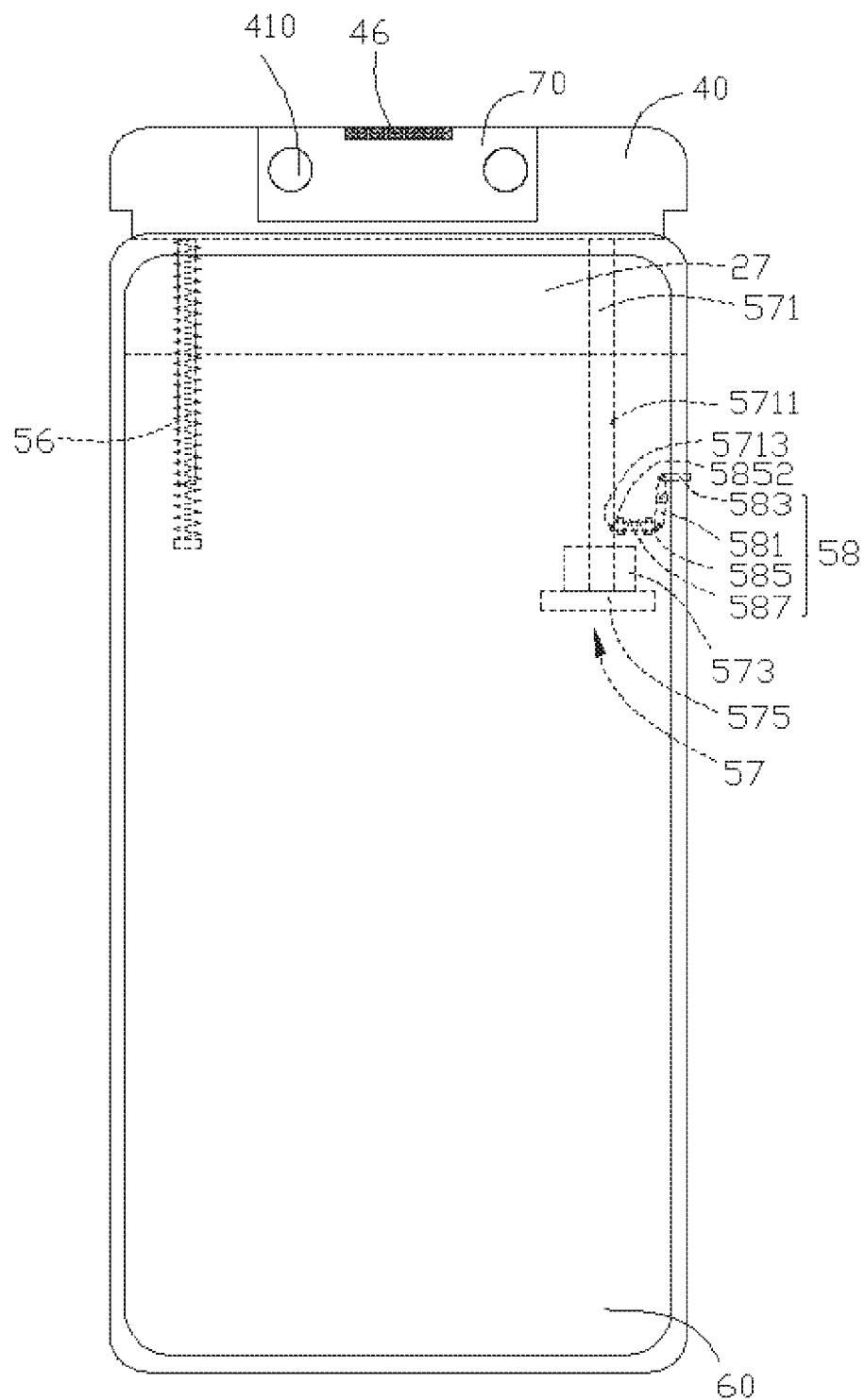
FIG. 13 is a structural view according to a seventh embodiment of the electronic apparatus of the present disclosure.

Reference is now made to FIG. 13 which is a structural view according to a seventh embodiment of the electronic apparatus of the present disclosure. The structure of the seventh embodiment of the electronic apparatus is similar to that of the first embodiment, and the difference therebetween lies in that: the driving device of the electronic apparatus of the seventh embodiment, which is different from the driving device of the electronic apparatus of the first embodiment, includes an elastic member 56 elastically abutting between the housing 20 and the mounting frame 40, and a guide mechanism 57 provided between the mounting frame 40 and the housing 20, and a positioning mechanism 58 provided on the housing 20. The elastic member 56 is used to push the mounting frame 40 to protrude out of the storage groove 27. In the embodiment, the elastic member 56 is a spring connected between the mounting frame 40 and the housing 20. The guide mechanism 57 includes a guide bar 571 connected to the mounting frame 40 and extending into the housing 20 in the protruding-retracting direction D of the mounting frame 40, a positioning block 573 provided within the housing 20 and corresponding to the guide bar 571, and a stop block 575 provided at an end of the guide bar 571 away from the mounting frame 40. The positioning block 573 defines a guide hole in the protruding-retracting direction D of the mounting frame 40. The guide bar 571 is slidably inserted into the guide hole. The stop block 575 can be provided at an end of the positioning block 573 away from the mounting frame 40 to prevent the mounting frame 40 from being detached from the housing 20. A peripheral wall of the guide bar 571 defines a first positioning slot 5711 adjacent to the mounting frame 40 and a second positioning slot 5713 away from the mounting frame 40. The positioning mechanism 58 includes a rotating member 581 rotatably connected to the housing 20, a pressing member 583 rotatably connected to an end of the rotating member 581, a positioning slider 585 rotatably connected to the other end of the rotating member 581 away from the pressing member 583, and an elastic member 587 connected to the positioning slider 585 and forcing it to be reset. An end of the positioning slider 585 away from the rotating member 581 is slidably inserted into the first positioning slot 5711 or the second positioning slot 5713, and an end of the positioning slider 585 adjacent to the guide bar 571 is provided with a guide face 5852. An end of the pressing member 583 away from the rotating member 581 protrudes out of the housing 20 to form an operation press-key. The operation press-key of the pressing member 583 is pressed to drive the rotating member 581 to rotate, so that the rotating member 581 drives the positioning slider 585 to slide out of the first positioning slot 5711 or the second positioning slot 5713, and the elastic member 587 is elastically deformed.

When the mounting frame 40 is received within the storage groove 27, the elastic member 56 is extruded between the mounting frame 40 and the housing 20 and is thus elastically deformed, and an end of the positioning slider 585 away from the rotating member 581 is clamped into the first positioning slot 5711 to prevent the elastic member 56 from pushing the mounting frame 40 to protrude out of the positioning slot 5711.

When the mounting frame 40 is required to protrude out of the storage groove 27, the operation press-key of the pressing member 583 is pressed to push the rotating member 581 to rotate, and the rotating member 581 drives the positioning slider 585 to slide in a direction away from the guide bar 571 to disengage from clamping of the first positioning slot 5711, and the elastic member 587 is elastically deformed. The elastic member 56 restores deformation to push the mounting frame 40 to protrude out of the storage groove 27. The guide bar 571 slides along the guide hole of the positioning block 573 until the mounting frame 40 protrudes out of the storage groove 27. At this time, the stop block 575 can be provided at the positioning block 573 to prevent the mounting frame 40 from being detached from the housing 20; and when the positioning slider 585 is directly facing the second positioning slot 5713, the elastic member 587 restores elastic deformation to push the positioning slider 585 to be clamped into the second positioning slot 5713 to position the mounting frame 40.

When the mounting frame 40 is required to retract into the storage groove 27, the mounting frame 40 is pressed toward the storage groove 27, such that the mounting frame 40 slides into the storage groove 27; and an upper face of the second positioning slot 5713 of the guide bar 571 is slidably pressed against the guide face 5852 of the positioning slider 585, such that the positioning slider 585 slides in a direction away from the second positioning slot 5713 to disengage from clamping of the guide bar 571. Both the elastic member 56 and the elastic member 587 are elastically deformed. When the guide bar 571 slides into the first positioning slot 5711 to directly face the positioning slider 585, the elastic member 587 restores deformation to push the positioning slider 585 to be clamped into the first positioning slot 5711 so as to position the mounting frame 40 to be received within the storage groove 27.

The mounting frame 40 of the seventh embodiment of the present disclosure is made manually to protrude out of or retract into the storage groove 27 via an elastic member 56 that abuts between the housing 20 and the mounting frame 40, a guide mechanism 57 provided between the mounting frame 40 and the housing 20, and a positioning mechanism 58 provided on the housing 20. Accordingly, the camera 410 not only does not occupy the area of the first display screen 60 of the electronic apparatus 100, thereby making it possible to increase the screen ratio of the electronic apparatus 100, but also can save energy and improve the user's operation feeling.

Figure 14:
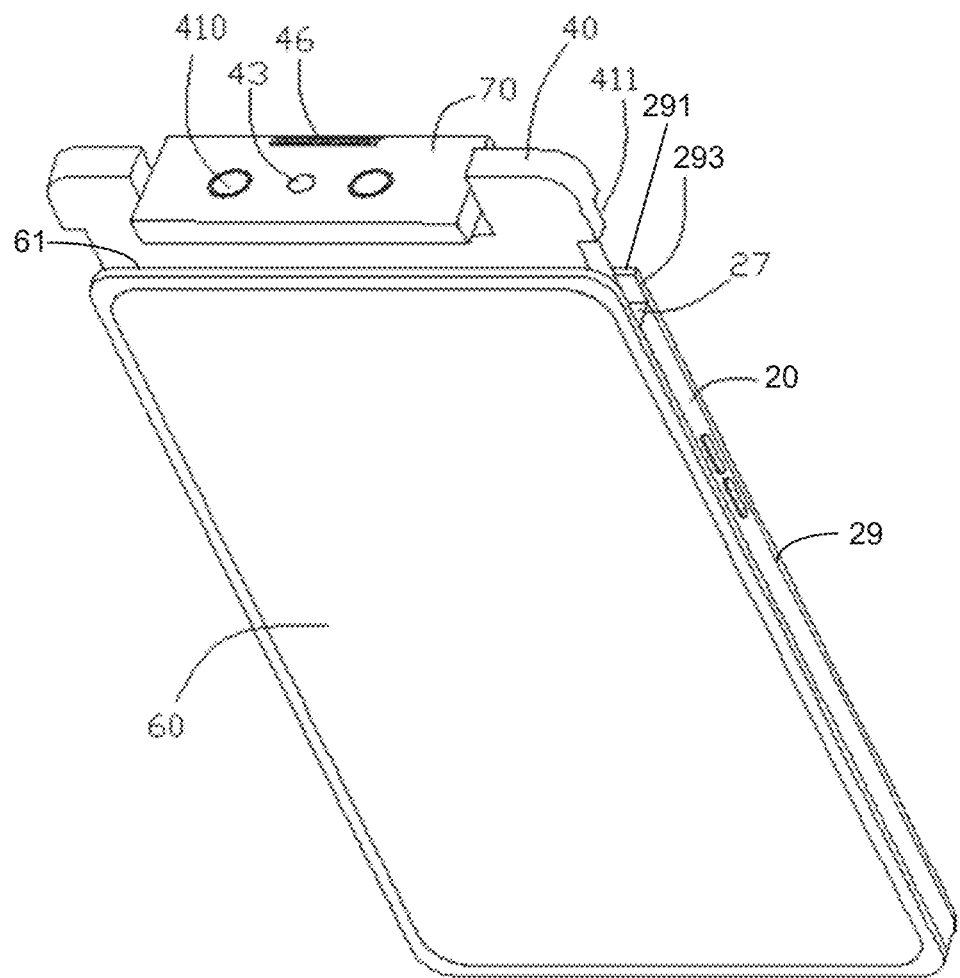
FIG. 14 is a three-dimensional structural view according to an eighth embodiment of an electronic apparatus of the present disclosure.

Reference is now made to FIG. 14 which is a three-dimensional structural view according to an eighth embodiment of an electronic apparatus of the present disclosure. The structure of the eighth embodiment of the electronic apparatus is similar to that of the first embodiment, and the difference therebetween lies in that: in the eighth embodiment, an orthogonal projection of a top face 291 of the back panel 29 on the rear side face of the housing 20 on the first display screen 60 is located below the top face 61 of the first display screen 60. The back panel 29, the housing 20, and the first display screen 60 enclose the storage groove 27. The mounting frame 40 defines an accommodating slot 411 at the bottom of the side face facing away from the first display screen. When the mounting frame 40 retracts into the storage groove 27, a top 293 of the back panel 29 is accommodated within the accommodating slot 411.

The foregoing are embodiments of the present disclosure. It should be noted that a person of ordinary skill in the art can further make some improvement and modification without departing from the principles of the embodiments of the present disclosure. The improvement and modification may also be regarded as falling into the protection scope of the present disclosure.

What is claimed is:

1. An electronic apparatus, comprising:
a housing;
a mainboard provided within the housing; and
a first display screen connected to the mainboard;
wherein the housing comprises a front side face, a rear side face, a left side face and a right side face opposite to each other, and a top face; the first display screen is provided on the front side face of the housing, a storage groove is defined on the top face of the housing in a left-right direction and is located between the front side face and the rear side face; and
wherein the electronic apparatus further comprises a mounting frame and a rotating box rotatably connected to the mounting frame, the rotating box being provided with a camera connected to the mainboard, the mounting frame being configured to protrude out of or retract into the storage groove to drive the rotating box to move out of or into the storage groove, such that the camera is exposed out of or hidden into the housing;

wherein a flange is provided on the top face of the housing adjacent to the rear side face, the flange extending in a left-right direction, the flange and the first display screen enclosing the storage groove, the mounting frame defining an accommodating slot at a bottom of a side face facing away from the first display screen, the flange being accommodated within the accommodating slot when the mounting frame retracts into the storage groove.

2. The electronic apparatus according to claim 1, wherein a rotating axis of the rotating box extends in a left-right direction, and wherein the mounting frame defines an accommodating opening which extends to a front side face and a rear side face of the mounting frame, the rotating box being rotatably accommodated within the accommodating opening along the rotating axis.

3. The electronic apparatus according to claim 2, wherein the accommodating opening is defined on a top face of the mounting frame, and two opposite left and right ends of the rotating box are respectively provided with two rotating shafts, axes of the two rotating shafts aligning with the rotating axis, the mounting frame defining two shaft holes corresponding to the two rotating shafts of the rotating box, the two rotating shafts being rotatably positioned within the two shaft holes respectively.

4. The electronic apparatus according to claim 2, wherein two opposite left and right end walls of the rotating box respectively define two shaft holes, the mounting frame being provided with two rotating shafts corresponding to the two shaft holes of the rotating box, axes of the two shaft holes aligning with the rotating axis, the two rotating shafts being rotatably positioned within the two shaft holes respectively.

5. The electronic apparatus according to claim 1, wherein the rear side face of the housing is provided with a second display screen, and the storage groove is defined by the top face of the housing, the first display screen and the second display screen.

6. An electronic apparatus, comprising:
a housing;
a mainboard provided within the housing; and
a first display screen connected to the mainboard;
wherein the housing comprises a front side face, a rear side face, a left side face and a right side face opposite to each other, and a top face; the first display screen is provided on the front side face of the housing, a storage groove is defined on the top face of the housing in a left-right direction and is located between the front side face and the rear side face; and
wherein the electronic apparatus further comprises a mounting frame and a rotating box rotatably connected to the mounting frame, the rotating box being provided with a camera connected to the mainboard, the mounting frame being configured to protrude out of or retract into the storage groove to drive the rotating box to move out of or into the storage groove, such that the camera is exposed out of or hidden into the housing;
wherein a back panel is provided on the rear side face of the housing, an orthogonal projection of a top face of the back panel on a rear side face of the first display screen being located below a top face of the first display screen, the back panel and the first display screen enclosing the storage groove, the mounting frame defining an accommodating slot at the bottom of the side face facing away from the first display screen, a top of the back panel being accommodated within the accommodating slot when the mounting frame retracts into the storage groove.

7. An electronic apparatus, comprising:
a housing;
a mainboard provided within the housing; and
a first display screen connected to the mainboard;
wherein the housing comprises a front side face, a rear side face, a left side face and a right side face opposite to each other, and a top face; the first display screen is provided on the front side face of the housing, a storage groove is defined on the top face of the housing in a left-right direction and is located between the front side face and the rear side face; and
wherein the electronic apparatus further comprises a mounting frame and a rotating box rotatably connected to the mounting frame, the rotating box being provided with a camera connected to the mainboard, the mounting frame being configured to protrude out of or retract into the storage groove to drive the rotating box to move out of or into the storage groove, such that the camera is exposed out of or hidden into the housing;
wherein the rotating box is provided, on a same side face of the camera, with an earpiece connected to the mainboard, the earpiece and the camera being arranged in a staggered manner, the earpiece being adjacent to the top face of the first display screen when the rotating box moves into the storage groove, and wherein a gap in communication with the earpiece is defined on the rotating box adjacent to the earpiece to transmit sounds of the earpiece from the gap when the mounting frame retracts into the storage groove.

8. The electronic apparatus according to claim 1, wherein a positioning member is provided between the rotating box and the mounting frame, the positioning member being configured to position the rotating box to rotate to any angle.

9. The electronic apparatus according to claim 1, wherein the electronic apparatus further comprises a first driving device for driving the rotating box to rotate.

10. The electronic apparatus according to claim 9, wherein the first driving device comprises a driving member provided within the mounting frame and connected to the mainboard, a driving gear provided on the driving member, and a driven gear provided on the rotating box and engaging with the driving gear, the driving member driving the driving gear to rotate to drive the driven gear to rotate, thereby driving the rotating box to rotate.

11. The electronic apparatus according to claim 9, wherein the first driving device comprises a driving member provided within the mounting frame and connected to the mainboard, and a transmission shaft connected between the driving member and the rotating box, the driving member driving the transmission shaft to rotate to drive the rotating box to rotate.

12. The electronic apparatus according to claim 9, wherein the electronic apparatus further comprises a second driving device, the second driving device comprising: a driving member fixed within the housing and connected to the mainboard, and a transmission rod provided on the driving member, the transmission rod extending in a protruding-retracting direction of the mounting frame and being provided with a spiral slot; wherein the mounting frame further comprises an extension strip extending in the protruding-retracting direction of the mounting frame, the extension strip being provided with a protrusion slidably accommodated within the spiral slot, wherein the driving member drives the transmission rod to rotate to drive the protrusion to slide along the spiral slot, such that the extension strip slides in the protruding-retracting direction of the mounting frame, thereby to drive the mounting frame to protrude out of or retract into the storage groove.

13. The electronic apparatus according to claim 9, wherein the electronic apparatus further comprises a second driving device, the second driving device comprising: a motor fixed within the housing and connected to the mainboard, and a screw connected to the motor, the screw extending in the protruding-retracting direction of the mounting frame, the mounting frame defining a screw hole screwed to the screw, the motor driving the screw to rotate thereby to drive the mounting frame to protrude out of or retract into the storage groove.

14. The electronic apparatus according to claim 9, wherein the electronic apparatus further comprises a second driving device, the second driving device comprising: a motor fixed within the housing and connected to the mainboard, a driving gear connected to the motor, and a rack provided on the mounting frame and extending in the protruding-retracting direction of the mounting frame, the rack engaging with the gear, the motor driving the gear to rotate thereby to drive the mounting frame to protrude out of retract into the storage groove.

15. The electronic apparatus according to claim 9, wherein the electronic apparatus further comprises a second driving device, the second driving device comprising: an electromagnet fixed in the housing and connected to the mainboard, and a magnet provided on the mounting frame and corresponding to the electromagnet, wherein when the mainboard supplies power to the electromagnet and magnetic poles between the electromagnet and the magnet are caused to be identical and mutually repelled, the mounting frame can be driven to protrude out of the storage groove; when the mainboard supplies power to the electromagnet and changes the power supply direction and magnetic poles between the electromagnet and the magnet are caused to be different and attract each other, the mounting frame can be driven to retract into the storage groove.

16. The electronic apparatus according to claim 9, wherein the electronic apparatus further comprises a second driving device, the second driving device comprising a motor fixed within the housing and connected to the mainboard, a driving gear connected to the motor, a transmission rod adjacent to the motor and extending in the protruding-retracting direction of the mounting frame, and a connecting rod adjacent to the transmission rod and sliding in the protruding-retracting direction of the mounting frame, an end of the transmission rod being provided with a driven gear engaging with the driving gear, an outer peripheral wall of the transmission rod defining a spiral slot in the protruding-retracting direction of the mounting frame, a top of the connecting rod being connected to the mounting frame, and a bottom of the connecting rod being provided with a sliding block slidably accommodated within the spiral slot of the corresponding transmission rod.

17. The electronic apparatus according to claim 9, wherein the electronic apparatus further comprises a second driving device, the second driving device comprises an elastic member elastically abutting between the housing and the mounting frame, a guide bar provided on the mounting frame in the protruding-retracting direction of the mounting frame, and a positioning mechanism, wherein the positioning mechanism comprises a rotating member rotatably connected to within the housing, a pressing member rotatably connected to an end of the rotating member, a positioning slider rotatably connected to the other end of the rotating member away from the pressing member, and an elastic member connected to the positioning slider for forcing it to be reset, the positioning slider being configured to position the guide bar, an end of the pressing member away from the rotating member extending out of the housing, the pressing member being pressed to drive the rotating member to rotate such that the rotating member drives the positioning slider away from positioning of the guide bar, the elastic member restoring deformation to push the mounting frame to protrude out of the storage groove.

* * * * *